UNITED STATES PATENT OFFICE.

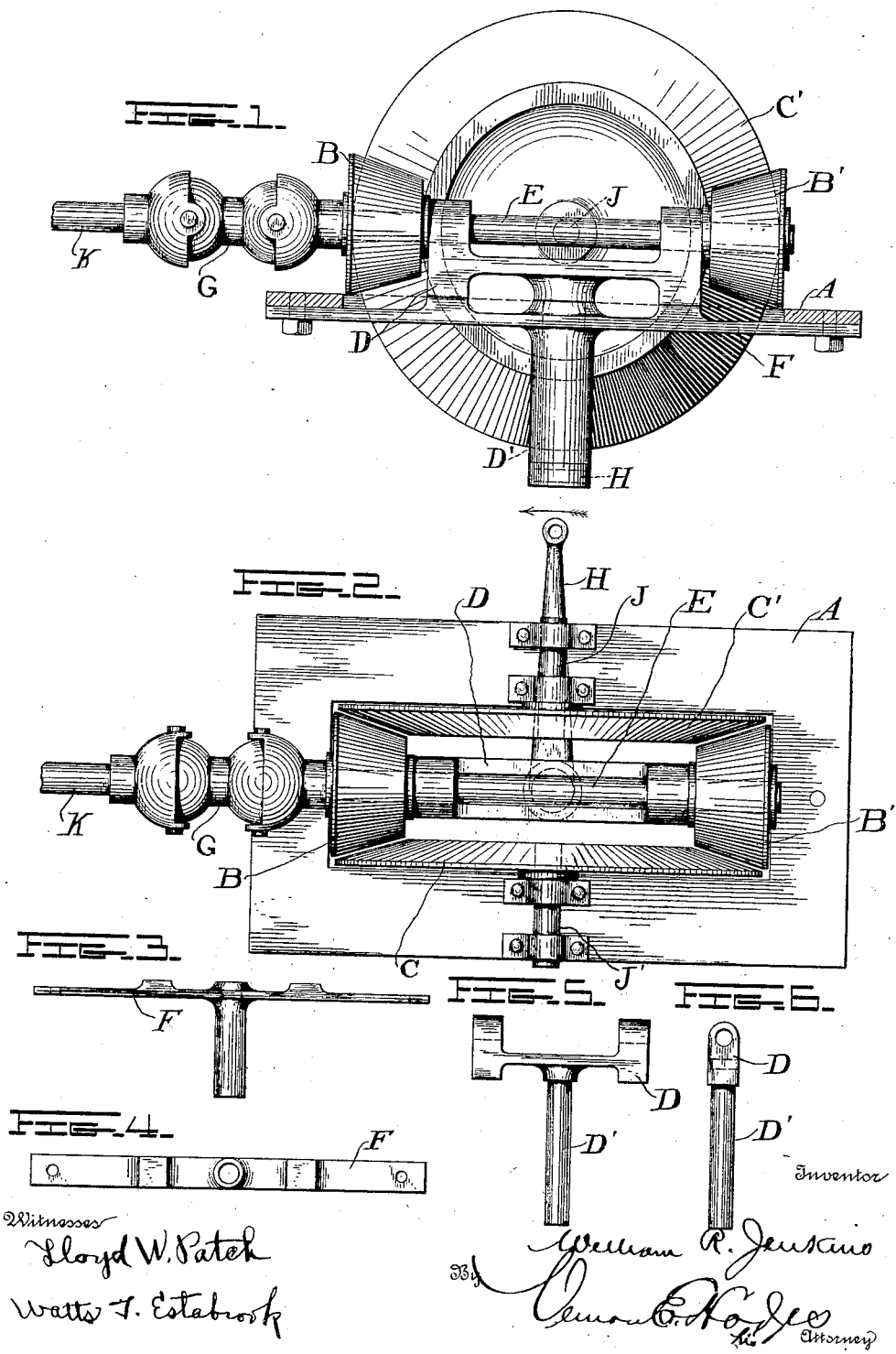

WILLIAM R. JENKINS, OF BELLEFONTE, PENNSYLVANIA.

FRICTION-GEARING.

No. 912,131.        Specification of Letters Patent.        Patented Feb. 9, 1909.

Application filed March 28, 1907. Serial No. 364,962.

*To all whom it may concern:*

Be it known that I, WILLIAM R. JENKINS, a citizen of the United States, residing at Bellefonte, in the county of Center and State of Pennsylvania, have invented certain new and useful Improvements in Friction-Gearing, of which the following is a specification.

My invention relates to an improvement in friction gearing, and the primary object is to simplify the construction and eliminate the noise incident to cog gearing, friction driving and driven pinions alone being employed for the transmission of power.

With the foregoing objects in view, my invention consists in shafts or axles on which are mounted bevel friction driven wheels, a shaft passing between these pinions pivotally mounted on a suitable yoke, and carrying bevel friction driving pinions, and means for turning the yoke whereby to cause the machine to be driven forward or reversed.

My invention further consists in certain novel features of construction, and combinations of parts which will be hereinafter described and pointed out in the claim.

In the accompanying drawings:—Figure 1 is a view in side elevation of my improved gearing. Fig. 2 is a plan view. Fig. 3 is a side elevation of yoke D. Fig. 4 is an end view of the same. Fig. 5 is a side view of the hanger F. Fig. 6 is a plan view of the same.

A, represents a bed plate, B, B', two bevel friction driving pinions mounted on a shaft E, and shaft E is journaled in bearings in yoke D, and this yoke D is provided with a pivot D' which turns in a hanger F, the latter being bolted to the under side of the bed plate as shown in Fig. 1.

J, J', are two shafts on which bevel friction driven wheels C and C' are mounted, these driven wheels C and C' being located on opposite sides of the bevel friction driving pinions B and B'.

K, the motor shaft, is connected to shaft E by means of a universal or flexible coupling G.

H is a lever for oscillating the yoke D.

In operation, power is applied to shaft K, and in this way motion is transmitted direct to bevel pinions B, B' through shaft E, which is coupled to motor shaft K by means of the universal joint or flexible coupling G. When these pinions B and B' are in their intermediate position, as shown in Fig. 2, they do not contact with either of the pinions C or C', and consequently no motion is transmitted to the wheels. The shaft E carries bevel pinions B and B' and is carried on a pivotally mounted yoke D, so that by swinging the lever H, the yoke is oscillated. By moving the lever H in the direction indicated by the arrow in Fig. 2, bevel pinion B will be brought into contact with bevel pinion C, and pinion B' into contact with bevel pinion C', causing the bevel wheels to rotate in one and the same direction, thus driving the vehicle forward. By reversing the lever H, the pinions will first be brought into an intermediate position shown in Fig. 2, that is to say, out of contact. On the further motion of lever H, pinions B will be in contact with pinion C', and pinion B' with pinion C, thus reversing the motion of the pinions C and C'.

From the foregoing it will be seen that I have provided a very simple mechanism for transmitting motion by friction, thus greatly reducing, if not absolutely preventing, the objectionable noise incident to the use of cog gears, as well as avoiding the danger incident to throwing the toothed gears suddenly into mesh which is liable to cause a sudden jar and jolting, and not infrequently tearing loose of teeth and the straining of parts of the machinery.

It is evident that more or less slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

In a friction gearing, the combination with shafts and beveled friction wheels thereon, of a shaft interposed within said wheels, friction pinions thereon, a yoke connected to said shaft, said yoke having only one pivot thereon, a hanger for supporting the yoke, said hanger having a hollow elongated shank adapted to receive the pivot of the yoke, and means for engaging the yoke whereby the pinions are oscillated.

In testimony whereof I have signed my name to this specification in the presence of two subscribing witnesses.

WILLIAM R. JENKINS.

Witnesses:
    W. HARRISON WALKER,
    MARY COONEY.